Figure 4:
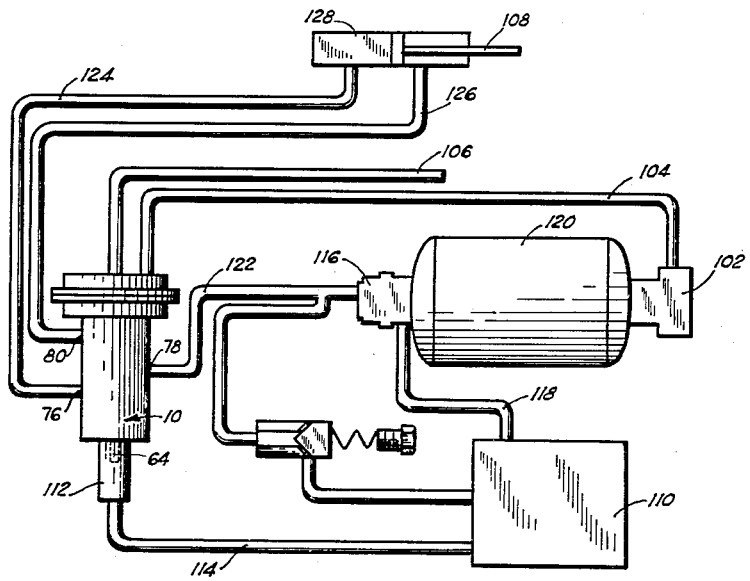

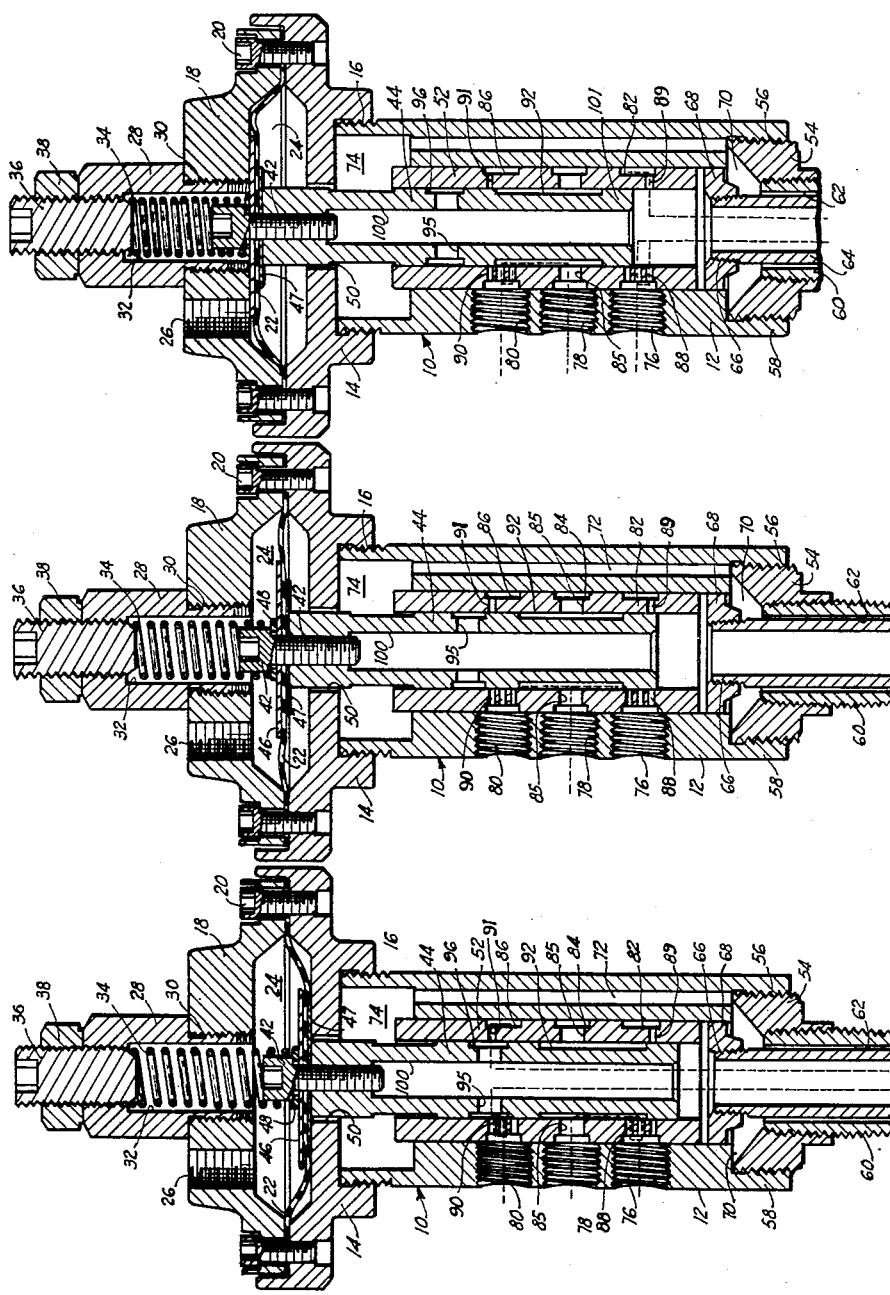

Nov. 28, 1961    I. L. FIFE ET AL    3,010,438
PNEUMATIC CONTROL VALVE FOR HYDRAULIC SYSTEM
Filed May 27, 1957    2 Sheets-Sheet 2

INVENTOR.
Irwin L. Fife
Clarence W. Brown
BY
ATTORNEY C. M. McKinley

United States Patent Office 3,010,438
Patented Nov. 28, 1961

3,010,438
PNEUMATIC CONTROL VALVE FOR HYDRAULIC SYSTEM
Irwin L. Fife, P.O. Box 878, Oklahoma City, Okla., and Clarence W. Brown, Oklahoma City, Okla.; said Brown assignor to said Fife
Filed May 27, 1957, Ser. No. 661,859
4 Claims. (Cl. 121—46.5)

This invention relates to improvements in valves, and more particularly, but not by way of limitation, to a pneumatically actuated metering valve wherein the movement of the valve plunger automatically regulates the volume of fluid flow through the valve.

The present invention contemplates a novel metering valve wherein the volume of fluid flow through the valve may be automatically regulated by a controlled reciprocal movement of the valve plunger member. A vacuum chamber or pressure chamber is provided within the valve body in communication with a diaphragm member secured to the plunger member to establish pressure differentials for a reciprocal actuation of the plunger. The pressure differentials acting on the diaphragm determine the length of the plunger stroke. The length of the plunger stroke, in turn, regulates the volume of fluid flowing through the valve. The fluid volume is directly proportional to the plunger stroke. Thus, the longer the valve stroke, the greater the quantity of fluid passing through the valve.

The pressure present within the pressure chamber may be remotely controlled by communication with a vacuum pump, or the like. Control of the pressure within the pressure chamber provides for a determination or regulation of the pressure differentials acting upon the diaphragm for moving the plunger member and therefore permits control of the reciprocation thereof. In this manner, the volume of fluid flowing through the valve may be automatically determined by control of the pressure differentials causing actuation of the plunger member.

The fluid passing through the valve may be utilized for control of a remotely disposed actuating member, such as a piston or the like, which is in communication with the valve or which is being controlled by the valve. The fluid may be recirculated through the novel valve in a manner whereby there is substantially no loss of fluid. Furthermore, the fluid exhaust passageway is so designed and constructed that gas or air foreign to the fluid passing through the valve can in no manner come into contact with the fluid. The breather conduit for air relief of the pneumatically actuated plunger member is completely separate from the exhaust passageway for the fluid flowing through the valve. Thus, no gas or air will be intermingled with the fluid, and the fluid will not be aerodated.

In addition, the novel valve is so designed and constructed that the area for exhaust of fluid from the valve is greater than the intake area at all times, except when the valve is in a neutral position, thereby precluding the possibility of undesirable hydraulic knocking within the valve during the operation thereof. A plurality of exhaust ports are provided within the valve and spaced with respect to the intake ports in such a manner that there are always a larger volume for exhaust for discharging fluid from the valve than intake volume for admitting the fluid into the valve, regardless of the quantity of fluid or rate of flow of the fluid moving into the valve.

It is an important object of this invention to provide a pneumatically actuated metering valve for automatically regulating the flow of fluid through the valve.

It is another object of this invention to provide a novel metering valve wherein the stroke of the valve plunger determines the volume of fluid flow through the valve.

It is still another object of this invention to provide a novel metering valve wherein the plunger member is reciprocated within the valve body by pressure differentials which may be remotely controlled for determining the rate of speed of the plunger.

Another object of this invention is to provide a novel metering valve so designed and constructed as to eliminate the possibility of undesirable hydraulic knocking during the operation thereof by maintaining a larger exhaust area for discharge of fluid than intake area for admitting the fluid into the valve.

And still another object of this invention is to provide a novel metering valve which is simple and economical in operation and efficient and durable in construction.

Other objects and advantages of the invention will be evident from the following detailed description, read in conjunction with the accompanying drawings, which illustrate our invention.

Figures 6, 7:
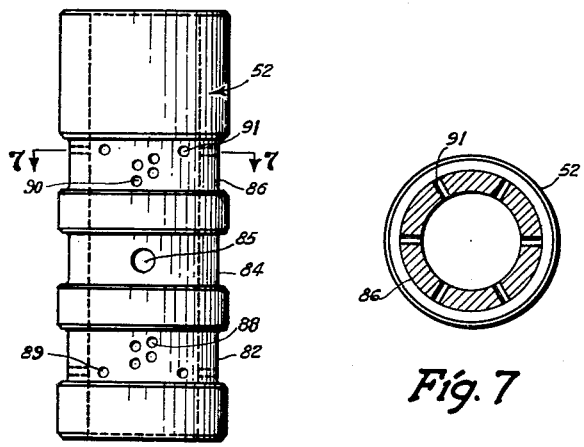
Figure 5:
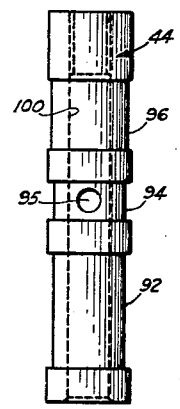

In the drawings:
FIGURE 1 is a sectional elevational view of a valve embodying the invention and shown with the valve plunger in a down position.
FIGURE 2 is a view similar to FIG. 1 with the valve plunger in a neutral position.
FIGURE 3 is a view similar to FIG. 1 with the valve plunger shown in an upper position.
FIGURE 4 is a schematic view depicting the novel valve in one system of operation.
FIGURE 5 is a side elevational view of the valve plunger member.
FIGURE 6 is a side elevational view of the valve body liner member.
FIGURE 7 is a view taken on line 7—7 of FIG. 6.

Referring to the drawings in detail, reference character 10 refers in general to a metering valve comprising a substantially cylindrical housing member 12 having a circular flange member 14 threadedly secured at 16 to the upper portion thereof. A complementary flange member 18 is disposed above the flange member 14 and is suitably secured thereto by means of bolt members 20, or the like, for retaining a diaphragm member 22 therebetween. A chamber 24 is provided between the members 14 and 18 and is enclosed on one side by the diaphragm 22. A threaded bore 26 is provided in the flange member 18 and extends into communication with the chamber 24 to permit control of the pressure therein as will be hereinafter set forth. A centrally disposed sleeve member 28 is threadedly secured at 30 to the member 18 and is provided with an internal bore 32 for receiving an adjusting spring 34 for a purpose as will be hereinafter set forth. A threaded bushing member 36 is threadedly inserted through the sleeve member 28 and into contact with the spring member 34 for cooperation therewith in providing substantially any desired spring tension. A suitable locking nut 38 is provided for securing the bushing 36 within the sleeve member 28 as clearly shown in the drawings.

The diaphragm member 22 is clamped or suitably secured between the members 14 and 18 and is provided with a centrally disposed threaded stud member 42 which extends therethrough for threadedly receiving a tubular plunger member 44. An upper plate member 46 and lower plate member 47 and a cooperating washer member 48 are preferably disposed adjacent the diaphragm member 22 and secured thereagainst by the stud member 42 for facilitating the securing of the plunger 44 to the diaphragm 22. It will thus be apparent that vertical movement or flexing of the diaphragm 22 will be transmitted to the plunger through the threaded stud 42. The plunger member 44 extends downwardly from the diaphragm 22 and through a central bore 50 of the flange member 14 and substantially throughout the length of the housing member 12.

A tubular valve body liner member 52 is disposed within the valve body 12 for slidably receiving the plunger member 44. The liner member 52 may be suitably secured within the valve body in any well known manner (not shown). A bushing member 54 is preferably threadedly secured at 56 to the lowermost portion 58 of the housing 12 and is adapted to receive externally threaded sleeve member 60. The sleeve member 60 is provided with a longitudinal bore 62 which is slightly larger than the outside diameter of an exhaust tube member 64 which extends longitudinally therethrough and upward into threaded connection at 66 with a sleeve member 68. The sleeve member 68 is disposed within the valve body 12 slightly below the valve liner member 52 and functions to provide a substantially annular chamber 70 between the tube member 64 and the uppermost portion of the bushing member 54. A longitudinal bore 72 is provided in the housing 12 and extends from the chamber 70 into communication with an upper chamber 74 provided within the valve body 12 adjacent the flange member 14 and below the diaphragm 22. The chamber 74 is in communication with the bore 50 of the member 14 and thus a passageway is formed from the bore 50, the chamber 74 and bore 72 into the chamber 70 and through the bore 62 to the atmosphere for a purpose as will be hereinafter set forth. Thus, the underside of the diaphragm 22 is constantly open to atmosphere pressure.

The valve body 12 is provided with a plurality of longitudinally spaced threaded bores, preferably three, 76, 78 and 80 for receiving suitable fitting members (not shown) which direct fluid to the valve 10 as will be hereinafter set forth. Referring now to FIG. 6, the valve liner member 52 is provided with a plurality of annular grooves, preferably three, 82, 84 and 86 which are substantially equally spaced for alignment with the threaded bores 76, 78 and 80, respectively, when the liner 52 is inserted within the valve body 12. The lowermost groove 82 and the uppermost groove 86 are provided with a plurality of relatively small spaced apertures 88 and 90, respectively. A plurality of circumferentially spaced exhaust ports 89 are provided in the groove 82 and are spaced below the apertures 88. Similarly, a plurality of circumferentially spaced exhaust ports 91 are provided in the groove 86 and are spaced slightly above the apertures 90. It will be apparent from FIG. 6 that the exhaust ports 89 and 91 are in substantially circumferential alignment, whereas the apertures 88 and 90 are both longitudinally and circumferentially spaced for a purpose as will be hereinafter set forth. Either the exhaust ports 89 or the exhaust ports 91 are always open for exhausting fluid during the operation of the valve 10 except when the valve is in a neutral position, as will be hereinafter set forth.

A pair of diametrically opposed ports 85 of a larger size than the apertures 88 and 90 are provided in the central or middle annular groove 84 and are preferably circumferentially spaced so that at least one of the ports 85 is in alignment with the port 78 of the valve body and as clearly shown in the drawings, FIGS. 1 through 3. Thus, any fluid entering the valve body through the port 78 will be discharged into the groove 84 and will flow through the ports 85 into the interior of the liner 52 and into contact with the outer periphery of the plunger 44 as will be hereinafter set forth.

The plunger member 44, as particularly shown in FIG. 5, is provided with a plurality of spaced annular grooves on the outer periphery thereof. It is preferable to provide three such grooves, a lowermost groove 92, a central groove 94 and an uppermost groove 96. The lowermost groove 92 is so positioned on the plunger as to extend from the valve liner body groove 82 to the valve liner groove 84 when the plunger is fully inserted with the liner 52 or in a lowermost position (FIG. 1). Thus, when the plunger 44 is inserted within the liner 52, fluid flowing into the valve body 12 through the port 78 will be directed through the bores 85 into the annular groove 92 of the plunger member.

The central groove 94 is provided with a plurality of circumferentially spaced bores 95 which may be positioned in alignment with the valve body bore 80 in a lowered position of the plunger. When the plunger 44 is lowered within the valve sufficiently to provide communication between the ports 85 and 88 through the annular groove 92, the fluid flowing through the valve will be directed from the inlet port 78 for discharge through the port 76. Simultaneously, exhaust fluid entering the valve body port 80 will be directed through the ports 91 and 95 into the internal bore 100 of the plunger member 44. The exhaust ports 91 are so spaced with respect to the ports 88 that the positioning of the plunger 44 in a sufficiently lowered position to open even one of the ports 88 simultaneously opens all of the ports 91 for exhaust of fluid. In this manner, a greater number of exhaust ports are always open for discharge of fluid than are open for moving the fluid into the valve. It will be apparent that a further lowering of the plunger member 44 will permit the fluid to exhaust through the ports 90 in addition to the ports 91. Thus, there are always a greater number of exhaust ports open for exhausting fluid from the valve than for moving the fluid into the valve. It is important to maintain the exhaust opening area greater than the inlet in order to preclude the possibility of any hydraulic knocking within the valve during the operation thereof. As hereinbefore set forth, the fluid is exhausted into the internal bore 100 of the plunger 44. The bore 100 extends downwardly through the plunger 44 into communication with the exhaust tube 64. Thus, the exhaust fluid will flow out of the valve 10 through the exhaust tube 64.

Conversely, when the plunger 44 is in a raised position, as shown in FIG. 3, communication is established between the inlet port 78 and the outlet port 80 through the annular groove 92. Thus, incoming fluid will be directed from the outlet port 78 to the discharge port 80. Simultaneously, exhaust fluid entering the valve through the port 76 will be discharged through the ports 89 into the interior of the liner member 52 at a point slightly below the lowermost end 101 of the plunger 44. The exhaust ports 89 are so spaced with respect to the apertures 90 that the positioning of the plunger 44 in a sufficiently raised position to open even one of the ports 90 simultaneously opens all the ports 89 for exhaust of fluid. A further raising of the plunger 44 will permit fluid to exhaust through the ports 88 in addition to the ports 89, thereby assuring that there will always be more ports open for exhaust of fluid than for admitting the fluid into the valve. The exhaust fluid will fall by gravity into the exhaust tube 64 for discharge from the valve 10.

It will be apparent that a neutral or centered position of the plunger 44 within the valve liner 52 as shown in FIG. 2 will center the plunger groove 92 between the ports 76 and 80 to preclude communication between the ports 76, 78 and 80. Thus, fluid entering the valve through the port 78 will be contained within the annular groove 92 and will not move through the valve body 12. The ports 88, 89, 90 and 91 are simultaneously closed by the contact of the outer periphery of the plunger 44 adjacent the ports. Thus, fluid in the ports 76 and 80 cannot enter the valve 10.

The ports 88 and 90 are circumferentially and longitudinally spaced within the grooves 82 and 86 in such a manner that a varying number of the ports are opened or in communication with the groove 92 depending upon the vertical position of the plunger 44 within the liner 52. When the plunger is in a slightly raised position with respect to the neutral position, only the lowermost of the ports 90 will be open for passing fluid from the valve 10. Thus, the quantity or volume of fluid passing through the valve 10 will be relatively small. However, when the plunger is in a fully raised position substantially all of the ports 90 will be open for permitting a greater volume of fluid to flow through the valve 10. Conversely, the slightly lowered position of the plunger 44 with respect to the neutral position thereof, will open only the uppermost of the ports 88, thereby providing for a flow of a relatively small volume of fluid through the valve 10. In the lowermost portion of the plunger 44, substantially all of the ports 88 will be open for permitting a greater quantity of fluid to flow through the valve 10. Thus, the reciprocal movement of the plunger member 44 within the liner body 52 will function to regulate the volume and direction of fluid flow through the valve 10.

As hereinbefore set forth, the under side or lower surface of the diaphragm 22 is always in communication with atmospheric pressure through the longitudinal passageway provided through the valve body by means of the bore 62 in communication with the chamber 70 and the bore 72 in communication with the chamber 74 and the bore 50. Thus, any downward flexing of the diaphragm 22 will force or move the pressure below the diaphragm downwardly through this passageway to atmosphere, thereby providing relief or a breather action during operation of the valve plunger 44. It is to be noted that the air relief passageway is completely separate from the exhaust passageway within the exhaust tube 64. Thus, the fluid being exhausted from the valve through the exhaust tube 64 can in no manner be aerodated or mixed with the air being discharged by actuation of the diaphragm 22.

Operation

It will be apparent from FIGS. 1, 2 and 3 that the reciprocal movement of the plunger 44 within the valve liner member 52 alters the position of the pump plunger peripheral groove member 92 with respect to the ports 76, 78 and 80 of the valve body 12. The plunger 44 is reciprocated within the liner 52 by the flexing of the diaphragm 22. The bottom or underside of the diaphragm 22 is always in communication with atmospheric pressure through the passageway formed by the bore 62, bore 70, bore 72, the chamber 74 and the bore 50, as hereinbefore set forth. Thus, the variation of the pressure within the chamber 24 above the diaphragm 22 will determine the speed and amount of flexing of the diaphragm 22. As shown in FIG. 1, when the pressure within the chamber 24 is equal to or substantially greater than atmospheric pressure, the action of the spring member 34, in addition to the weight of the members 42, 45, 46 and 48, will urge the diaphragm 22 toward a downward position adjacent the flange member 14. As hereinbefore set forth, the plunger 44 is threadedly secured to the diaphragm 22 by means of the stud member 42 and thus moves downwardly within the valve liner 52 upon a downward flexing of the diaphragm 22.

It will be apparent that the pressure differentials acting upon the diaphragm 22 will determine the extent of the downward flexing thereof. The plunger 44 and diaphragm 22 as shown in FIG. 1 are depicted in the lowermost position. In this downward position, the annular groove 92 on the plunger 44 is in substantial alignment with the annular grooves 82 and 84 of the liner member 52 and thereby provides a passageway or communication between the lower ports 88 and the medial ports 85. In this manner, communication is established between the ports 76 and 78 of the valve body 12. Thus, fluid pressure entering the valve through the port 78 will be directed to the port 76 for discharge therefrom. It will be apparent that a varying number of ports 88 will be open to permit discharge of fluid from the valve depending upon the vertical position of the plunger 44 within the body valve liner 52. In its lowermost position, substantially all of the ports 88 will be open thereby permitting the greatest volume of fluid to pass through the valve. In a slightly raised position, only a few of the ports 88 will be open, thereby regulating the quantity or volume of fluid flowing through the valve. Simultaneously with the passing of the fluid through the valve, it will be noted that the annular groove 94 of the piston 44 is in communication with the ports 90 of the body liner 52. Thus, fluid may be exhausted through the port 80 and ports 90 for discharge through the ports 95 into the interior or central bore 100 of the plunger 44. The exhaust fluid drops by gravity downwardly through the plunger 44 and through the exhaust tube member 64. The exhaust tube member 64 extends downwardly from the valve body 12 into communication with a fluid reservoir (not shown) and the exhaust fluid will be discharged into the oil or fluid reservoir through the tube 64.

When the pressure within the chamber 24 is reduced slightly below atmospheric pressure and to such a condition wherein the pressure of the spring 34 acting on the diaphragm 22 is equal to the atmospheric pressure on the lower surface thereof, the diaphragm will be raised to a substantially horizontal position as shown in FIG. 2, thereby lifting the plunger 44 into a neutral position. In this neutral position, the annular groove 92 is in communication only with the port 85, and thus pressure entering the valve through the valve body port 78 will be directed through the port 85 into the annular groove 92 and can in no manner pass through the valve.

When the pressure within the chamber 24 is reduced to a substantial vacuum, the atmospheric pressure acting on the lower face of the diaphragm 22 will flex the diaphragm upwardly into a position adjacent the member 18 (FIG. 3). It will be apparent that varying degrees of the lowering of the pressure within the chamber 24 will create varying degrees of upward flexing of the diaphragm 22 and a decrease of the pressure to a substantial vacuum stage will result in the maximum upward flexing of the diaphragm as shown in FIG. 3. In its uppermost position the diaphragm member 22 moves the plunger member 44 within the liner body 52 to an uppermost position. In this uppermost position of the valve plunger 44 communication is established between the valve liner ports 90 and 85 through the annular groove 92. Thus, pressure entering the valve 10 through the port 78 will be directed to the ports 90 for discharge through the port 80. It will be apparent that a varying number of the ports 90 will be open to discharge fluid pressure from the valve depending upon the height of the plunger 44 within the liner 52. The greater the number of ports 90 open to receive fluid, the larger the volume of fluid which may pass through the valve. Conversely, the fewer number of ports 90 open to discharge fluid, the smaller the volume of fluid which may pass through the valve 10. Simultaneously with the passage of fluid from the port 78 and outward through the port 80, fluid may be exhausted from the valve through the port 76. The exhaust fluid moving into the valve through the port 76 will be discharged through the ports 88 into the interior of the valve body liner 52 at a point below the lower end 101 of the plunger 44 for discharge through the exhaust tube 64 as hereinbefore set forth.

The chamber 24 may be in communication with a vacuum pump or the like 102 (FIG. 4) by means of a suitable vacuum line 104 which may be secured into the threaded bore 26 in any well known manner. A second vacuum line 106 may be suitably connected with a similar bore (not shown) to provide communication with a sensing head or feeler member, or the like (not shown), such as disclosed in Irwin L. Fife patent application, Serial No. 526,619 filed August 5, 1955, now Patent No. 2,797,091 issued on June 25, 1957. In this maner, the pressure within the chamber 24 may be controlled to reciprocate the plunger 44 at any desired rate of speed and to any predetermined length of plunger stroke. Thus, the fluid flow through the valve may be regulated by a remote control of the pressure within the chamber 24.

By way of example, the valve 10 may be utilized for reciprocating a remotely disposed actuating piston 108 as shown in FIG. 4. In this environmental flow diagram, an oil reservoir vessel 110 is in communication with an auxiliary oil chamber 112 by means of a suitable conduit 114. The exhaust tube 64, shown in dotted lines in FIG. 4, extends downwardly within the auxiliary oil chamber 112 to a point below the surface of the oil or fluid therein. The oil reservoir 110 is also in communication with an oil pressure pump 116 through the conduit 118. The oil pressure pump 116 may be actuated by a suitable motor 120, or the like, for pumping oil or other suitable fluid from the oil reservoir 110 into the port 78 of the valve 10 through the conduit 122. The motor 120 may also be utilized for operation of the vacuum pump 102.

The lower valve port 76 is in communication with the left hand side of the piston 108, as viewed in FIG. 4, through the conduit 124. Similarly, the upper valve port 80 is in communication with the right hand side of the piston 108 through a conduit 126. It will be apparent that fluid pressure supplied and discharged alternately through the conduits 124 and 126 will provide for reciprocation of the piston 108 within the cylinder 128. When the plunger 44 within the valve 10 is in a lowered position, the fluid entering the valve through the port 78 from the conduit 122 will be directed into the port 76 for discharge from the valve 10 through the conduit 124, thereby moving the actuating piston 108 in a right hand direction. A right hand movement of the piston 108 will force any fluid present on the right hand side thereof to move through the conduit 126 in a reverse direction as compared to the fluid moving in the conduit 124 and thus will discharge the fluid into the valve 10 through the port 80. This exhaust fluid will be carried through the ports 80 and ports 90 and 95 into the internal bore 100 or the plunger 44 whereupon the fluid will fall by gravity downwardly through the valve and out the exhaust tube 64 and into the auxiliary oil reservoir 112. The oil in the auxiliary oil reservoir 112 will be returned to the main oil reservoir 110 through the conduit 114.

In order to reverse the movement of the actuating piston 108 or move the piston in a left hand direction, the plunger member 44 of the valve 10 may be moved to a raised or upward position. In this upward position, fluid entering the valve 10 through port 78 will be directed to the ports 90 for discharge through valve port 80 into the line 126. Thus, the fluid from the conduit 126 will be forced into the cylinder 128 for acting against the right hand side of the piston 108, thereby moving the piston in a left hand direction. This left hand movement of the piston 108 will force the fluid to the left thereof to move in a reverse direction through the conduit 124 for discharge into the valve 10 through the port 76. The fluid entering the valve 10 through port 76 will pass through the ports 88 for discharge into the interior of the valve liner 52 where the fluid will drop by gravity through the exhaust tube 64 and into the auxiliary reservoir 112. A continued reciprocation of the plunger 44 within the valve 10 as determined by the pressure variances within the chamber 24 will provide for a reciprocal action for the piston 108 within the cylinder 128. It will be apparent that the actuating of the piston member 108 may be controlled by the quantity of fluid delivered to the cylinder 128 from the valve 10. Thus, the control of the reciprocal movement of the plunger 44 will automatically control the actuation of the piston 108.

From the foregoing, it will be apparent that the present invention provides a novel metering valve so designed and constructed for automatically regulating the volume of fluid flow through the valve. A reciprocal plunger member within the valve body determines the rate of speed of the fluid flow as well as the volume of fluid passing through the valve. The reciprocal movement of the plunger member is determined by pressure differentials which act upon the diaphragm member for a flexing thereof. Thus, the reciprocal movement of the plunger is entirely controlled by the pressure differentials acting on the diaphragm member. The pressure differentials may be regulated to provide for substantially any desired rate of speed and length of stroke for the pump plunger member and thereby an automatic control of both the volume and rate of speed of fluid flowing through the valve. The novel valve is of a simple and durable construction and is economical and efficient in operation.

Changes may be made in the combination and arrangement of parts as heretofore set forth in the specification and shown in the drawings, it being understood that any modification in the precise embodiment of the invention may be made within the scope of the following claims without departing from the spirit of the invention.

We claim:

1. A valve comprising a cylindrical body, a substantially annular flange member provided on the body, a complementary flange member rigidly secured to the first flange member, a diaphragm member secured between the flange members, a pressure chamber provided between the flange members and adjacent the diaphragm, means for controlling the pressure in the pressure chamber whereby the diaphragm member may be flexed in at least two directions, an apertured sleeve member disposed within the housing, a plunger member reciprocally disposed within the sleeve member, said plunger member secured to the diaphragm member for reciprocal movement thereby, an inlet port provided in the housing for directing fluid through the apertured sleeve and into contact with the outer periphery of the plunger, a plurality of outlet ports provided in the housing, means on the outer periphery of the plunger for selectively regulating the flow of the fluid through the valve from the inlet port to the outlet ports as determined by the reciprocal position of the plunger within the sleeve member, an exhaust passageway for discharging the fluid from the valve, and a relief passageway in communication from the diaphragm to the atmosphere for facilitating the flexing thereof.

2. A pneumatically actuated valve for regulating the flow of fluid and comprising a substantially cylindrical sectional housing, a diaphragm member secured within the housing, a pressure chamber provided adjacent the diaphragm, means for controlling the pneumatic pressure within the pressure chamber to provide for a flexing of the diaphragm, a plurality of spaced bores provided in the housing for directing the fluid through the valve, a sleeve member disposed within the housing, a plurality of spaced apertures provided in the sleeve member in substantial alignment with the bores therein, a tubular plunger member reciprocally disposed within the sleeve member and secured to the diaphragm member for movement therewith during the flexing of the diaphragm, a plurality of annular grooves provided on the outer periphery of the plunger member for cooperating with the sleeve member in selectively directing the fluid through the spaced bores in the housing, an exhaust tube member secured to the housing for discharging the fluid therefrom, and passageway means extending longitudinally through the housing to the atmosphere for relief of pneumatic pressure during flexing of the diaphragm.

3. A valve for automatically regulating the flow of fluid therethrough and comprising a substantially cylindrical housing, an annular flange member secured to the housing, a complementary flange member secured to the first flange member, a diaphragm member secured between the flange members, a pressure chamber provided between the flange members and adjacent the diaphragm, means for controlling the pressure differentials acting upon the diaphragm for providing a flexing thereof, a sleeve member provided within the housing, a plurality of spaced bores provided in the housing for directing the fluid in and out of the valve, a plurality of spaced annular grooves provided on the outer periphery of the sleeve member and in alignment with the spaced bores, a plurality of apertures provided in the sleeve member adjacent to each of the annular groove members, a tubular plunger member slidably disposed within the sleeve member, said plunger member secured to said diaphragm member for reciprocal movement thereby within the sleeve member, a plurality of annular grooves provided on the outer periphery of the plunger member for cooperation with the sleeve member to selectively regulate the flow of fluid through the spaced bores in the housing, an exhaust tube member secured to the housing, a plurality of apertures provided in the plunger member for facilitating discharge of the fluid from the valve through the exhaust tube, and a breather passageway means to the atmosphere for facilitating the flexing of the diaphragm.

4. A pneumatically operated valve for automatically regulating the flow of fluid therethrough and comprising a sectional housing member, the housing member provided with an inlet bore member for directing the fluid into the valve, said housing member also provided with upper and lower outlet bores for directing the fluid out of the valve, a diaphragm secured within the housing, a pressure chamber adjacent the diaphragm, means for regulating the pressure within the pressure chamber to provide for a flexing of the diaphragm, a sleeve member disposed within the housing and provided with a plurality of apertures adjacent the aforementioned inlet and outlet bores, a tubular plunger member reciprocally disposed within the sleeve member and secured to the diaphragm for reciprocal movement thereby, an annular groove provided on the outer periphery of the plunger member for cooperation with the apertured sleeve member to regulate the flow of fluid through the valve, a raised position of said plunger providing for flow of fluid from the inlet bore to the upper bore, a lowered position of said plunger providing for flow of fluid from the inlet bore to the lower bore, a centered position of said plunger member precluding flow of fluid to the upper and lower bores, an exhaust passageway for discharging the fluid from the valve and separate passageway means for pressure relief from the diaphragm to the atmosphere thereby facilitating the flexing thereof.

References Cited in the file of this patent

UNITED STATES PATENTS

| | | |
|---|---|---|
| 651,334 | Baker et al. | June 12, 1900 |
| 701,574 | King | June 3, 1902 |
| 789,026 | Huston | May 2, 1905 |
| 799,236 | Johnson | Sept. 2, 1905 |
| 2,396,643 | De Ganal | Mar. 19, 1946 |
| 2,489,450 | Crookston | Nov. 29, 1949 |
| 2,493,449 | Fitch | Jan. 3, 1950 |
| 2,526,361 | Johnson | Oct. 17, 1950 |
| 2,582,088 | Walthers | Jan. 8, 1952 |
| 2,621,676 | Loft | Dec. 16, 1952 |
| 2,629,365 | Kennedy | Feb. 24, 1953 |
| 2,631,571 | Parker | Mar. 17, 1953 |
| 2,648,313 | Clifton | Aug. 11, 1953 |
| 2,654,348 | Beck | Oct. 6, 1953 |
| 2,655,904 | Strayer et al. | Oct. 20, 1953 |
| 2,696,196 | Adams | Dec. 7, 1954 |
| 2,702,685 | Capsek | Feb. 22, 1955 |
| 2,705,046 | Schroeder | Mar. 29, 1955 |
| 2,706,467 | Houldsworth | Apr. 19, 1955 |
| 2,736,170 | Huse | Feb. 28, 1956 |
| 2,751,752 | Metcalf | June 26, 1956 |
| 2,754,843 | Hauber | July 17, 1956 |
| 2,757,516 | Buttolph | Aug. 7, 1956 |
| 2,767,689 | Moog | Oct. 23, 1956 |

FOREIGN PATENTS

| | | |
|---|---|---|
| 986,906 | France | Apr. 11, 1951 |